H. C. Babcock,

Belt Fastener,

No. 3,236. Reissued Dec. 22, 1868.

Witnesses:
James H. Layman
C. H. Pickles

Inventor:
H. C. Babcock
By Knight Bros
Attys

United States Patent Office.

HOLLAND C. BABCOCK, OF CINCINNATI, OHIO, ASSIGNOR TO HIMSELF AND MARSHALL JEWELL, OF HARTFORD, CONNECTICUT.

*Letters Patent No.* 70,775, *dated November* 12, 1867; *reissue No.* 3,236, *dated December* 22, 1868.

IMPROVED BELT-LACING.

The Schedule referred to in these Letters Patent and making part of the same.

*To all whom it may concern:*

Be it known that I, HOLLAND C. BABCOCK, of Cincinnati, Hamilton county, State of Ohio, have invented a new and useful Manufacture of Belt-Lacing; and to enable others skilled in the art to make and use the same, I will proceed to describe, referring to the drawings, in which the same letters indicate like parts in each of the figures.

The numerous class of manufacturers who employ machine-belting are accustomed to cut their lacing, as wanted, from a side of leather kept for that purpose. This leather, from its necessary greasy character, soils all it comes in contact with, and itself becomes soiled and much deteriorated by exposure to dust and atmospheric influences, the said dust acting to absorb the grease, and to destroy the nature of the leather. Moreover, great loss of time is entailed, when a belt parts, by the necessity of waiting until another lace can be prepared or a fresh side procured. A side of leather remains so long on hand, with small manufacturers, as to greatly aggravate the above evils. Then, also, the laces being prepared rudely by hand, are of such unequal widths as to waste about one-fourth of the leather, and to require larger holes than necessary in the belting, and occasion unequal strain on different parts thereof.

By means of suitable machines, I cut each side of leather up into a number of thongs, of assorted but definite lengths and widths, one or both ends of which being pointed, and stiffened, in manner hereafter explained, to facilitate its insertion and passage through the holes of the belt.

Sometimes one end of the thongs is provided with an eye or slit, for the purpose of joining the ends, and to enable the lace to be securely looped to one of the ends of the belt, preliminary to lacing.

In the accompanying drawings—

I take a side of lace-leather, and, by means of suitable appliances, which I design to make the subject of a patent, I convert said side into lacing, of diverse sizes, and definite width, suitable for every description of belting.

Figure 1:
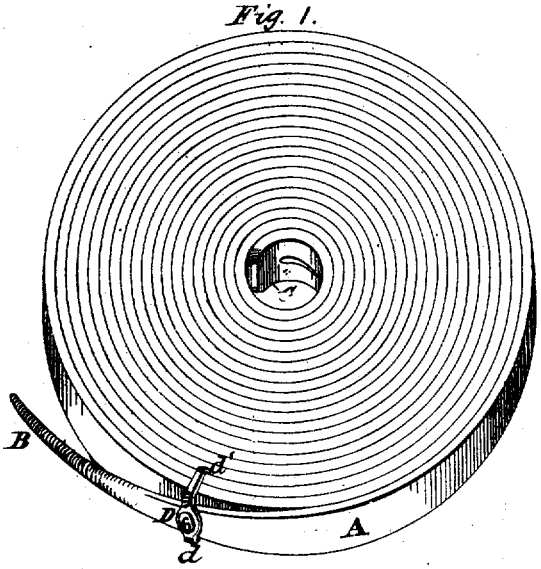
Figure 1 is a perspective view of one of my improved belt-laces, in coil-form, for packing.
Figure 2:
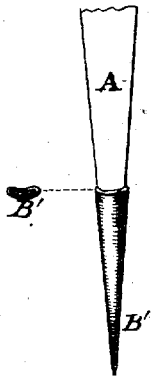
Figure 2 represents a modification of the tip.
Figure 3:
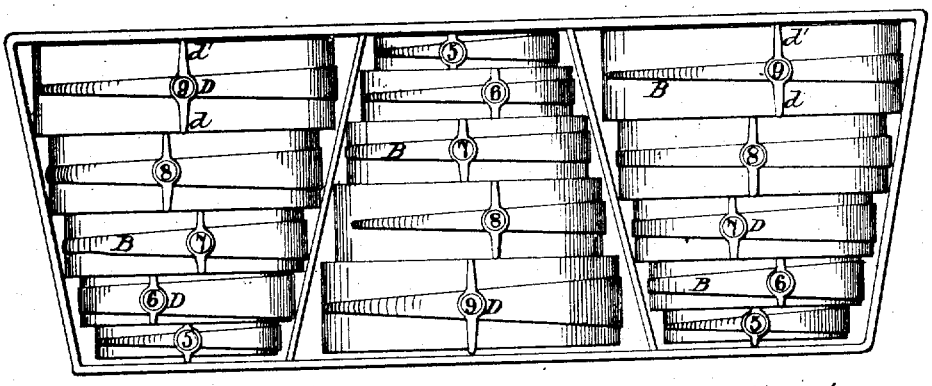
Figure 3 shows the mode of packing my lacing in assorted sizes.

Having suitably reduced the width of the thin end of each lace A, I convert the said end to a sharp and stiff point, either by heat and pressure, as at B, fig. 1, or by enveloping the same in a metallic tip, as at B′, fig. 2. The tip B or B′ is formed concave or convex, so as to facilitate its insertion through the eyelets, and to serve as a guide, to avoid twisting in the act of lacing.

In the thick end of each lace, near its extremity, I make a slit, C, through which to pass the pointed end B, so as to enable the lace to be securely looped to one of the ends of the belt, preliminary to lacing.

D is a tag or clip, having its back marked with the length of the lace, and having claws *d d′*, which, being clinched around the lace, serve to hold it to the coiled form.

The following are among the advantages of my improved belt-lacing:

Economy of material, as they are cut true and straight; great saving in time to consumers, as they are always ready for immediate use when a belt breaks. Each lacing is cut the right width and length for a specified width of belting. They are cut true, and will draw into a small punch-hole. Each hole of belt contains the same bulk and substance. The strain is equally divided. The lacing is not liable to cut or tear out of the holes. The pointed and stiffened tip much facilitates the operation of lacing, and supersedes the necessity of a belt-awl.

My object in coiling each lace separate is to have them convenient to use, and to be within the reach of all. They occupy but a small space, one coil packed above another. They can be shipped to and used in any climate, and the atmosphere is less liable to affect them than in the original sides. They are generally put into market.

The device for fastening holds the ends securely, and is easily detached; also answers for a tag for marking the length.

Leather thus converted into lacings occupies less than half the bulk of the original hide, and can be put up in larger or smaller packages, to suit purchasers.

I believe I have thus shown the nature, construction, and advantages of this invention, so as to enable others skilled in the art to make and use the same therefrom.

What I claim, therefore, and desire to secure by Letters Patent, is—

1. Belt-lacings, with a hardened or metallic tip or point, as a new article of manufacture.

2. As a new manufacture, or commodity, belt-thongs, in coil or package, substantially as described.

HOLLAND C. BABCOCK.

Witnesses:

E. W. BLISS,

JEREMY W. BLISS.